US009397839B2

(12) United States Patent
Thoniel et al.

(10) Patent No.: US 9,397,839 B2
(45) Date of Patent: Jul. 19, 2016

(54) NON-HIERARCHICAL INFRASTRUCTURE FOR MANAGING TWIN-SECURITY KEYS OF PHYSICAL PERSONS OR OF ELEMENTS (IGCP/PKI)

(75) Inventors: Pascal Thoniel, Poitiers (FR); Francis Melemedjian, Issy-les-Moulineaux (FR)

(73) Assignee: NTX RESEARCH SA, Paris (FR)

( * ) Notice: Subject to any disclaimer, the term of this patent is extended or adjusted under 35 U.S.C. 154(b) by 274 days.

(21) Appl. No.: 14/007,359

(22) PCT Filed: Sep. 29, 2011

(86) PCT No.: PCT/FR2011/000532
§ 371 (c)(1),
(2), (4) Date: Sep. 25, 2013

(87) PCT Pub. No.: WO2012/131175
PCT Pub. Date: Oct. 4, 2012

(65) Prior Publication Data
US 2014/0013110 A1 Jan. 9, 2014

(30) Foreign Application Priority Data
Mar. 25, 2011 (WO) ................ PCT/FR2011/000178

(51) Int. Cl.
H04L 29/06 (2006.01)
H04L 9/32 (2006.01)
H04L 9/08 (2006.01)
G06F 21/33 (2013.01)

(52) U.S. Cl.
CPC .............. H04L 9/3263 (2013.01); H04L 9/083 (2013.01); H04L 9/321 (2013.01); G06F 21/33 (2013.01); H04L 9/3268 (2013.01)

(58) Field of Classification Search
CPC ..... H04L 9/3263; H04L 9/3268; H04L 9/083; H04L 9/321; G06F 21/33
USPC .......................... 713/155, 156, 175
See application file for complete search history.

(56) References Cited

U.S. PATENT DOCUMENTS

| 5,136,643 | A  | * | 8/1992  | Fischer ..................... G07F 7/08 380/30 |
| 5,745,574 | A  | * | 4/1998  | Muftic .................. H04L 9/3268 380/286 |
| 6,073,242 | A  | * | 6/2000  | Hardy .................... G06F 21/604 380/255 |
| 7,020,778 | B1 | * | 3/2006  | Miettinen ............. H04L 9/3247 379/93.02 |
| 7,028,181 | B1 | * | 4/2006  | McCullough ........... G06F 21/33 380/277 |
| 2001/0032314 | A1 | * | 10/2001 | Ansper ................. H04L 9/3247 713/176 |
| 2002/0032856 | A1 | * | 3/2002  | Noguchi ............... G06F 21/645 713/156 |
| 2002/0143704 | A1 | * | 10/2002 | Nassiri ................. G06Q 20/401 705/51 |
| 2002/0144111 | A1 | * | 10/2002 | Aull ....................... G06F 21/33 713/157 |
| 2002/0150241 | A1 |   | 10/2002 | Scheidt et al. |
| 2003/0115468 | A1 | * | 6/2003  | Aull ...................... G06F 21/606 713/175 |
| 2003/0177360 | A1 | * | 9/2003  | Carmichael ........... G06Q 10/10 713/176 |
| 2004/0162984 | A1 | * | 8/2004  | Freeman .............. G06Q 20/341 713/175 |
| 2007/0217344 | A1 |   | 9/2007  | Krywaniuk |
| 2008/0209516 | A1 | * | 8/2008  | Nassiri ................... G06F 21/32 726/3 |
| 2009/0049298 | A1 | * | 2/2009  | Hatter ...................... H04L 9/32 713/176 |
| 2012/0204032 | A1 | * | 8/2012  | Wilkins ................. H04L 9/006 713/170 |

FOREIGN PATENT DOCUMENTS

| EP | 1 162 781 A2 | 12/2001 | |
| EP | 1162781 A2 * | 12/2001 | ............. G06F 21/33 |
| WO | 03/046748 A1 | 6/2003 | |
| WO | 2007/006008 A2 | 1/2007 | |
| WO | 2011/117486 A1 | 9/2011 | |

OTHER PUBLICATIONS

"PKCS #1 v2.1: RSA Cryptography Standard," RSA Laboratories, Jun. 14, 2002, pp. 1-61, RSA Security Inc.

* cited by examiner

Primary Examiner — Jayesh Jhaveri
(74) Attorney, Agent, or Firm — Nath, Goldberg & Meyer; Jerald L. Meyer

(57) ABSTRACT

A non-hierarchical infrastructure for managing twin-security keys of physical persons or of elements includes a public key and a private key with a public key certificate. The structure does not include any certification authority distinct from the physical persons or elements, but does include at least one registering authority and its electronic notary server. There is provided at least one registering authority and its electronic notary server for a circle of trust. The registering authority includes local registering agencies. The local registering agency establishes, after face-to-face verification of the identity of the physical person or of the identification of the element, a public key certificate, and a "public key ownership certificate", which does not contain the public key of the person or of the element but the print thereof, and which is transmitted in a secure manner to the associated electronic notary server for storing in a secure manner.

18 Claims, No Drawings

NON-HIERARCHICAL INFRASTRUCTURE FOR MANAGING TWIN-SECURITY KEYS OF PHYSICAL PERSONS OR OF ELEMENTS (IGCP/PKI)

This is a National Phase Application filed under 35 U.S.C. §371 as a national stage of International Application No. PCT/FR2011/000532, filed Sep. 29, 2011, claiming the benefit from International Application No. PCT/FR2011/000178, filed Mar. 25, 2011, the entire content of each of which is hereby incorporated by reference in its entirety.

The invention relates to a public key management infrastructure (French acronym IGCP), known as Public Key Infrastructure (PKI)—an applied asymmetrical cryptography system comprising a pair of keys (key pair), namely a public key and a private key—its organization, its cryptographic protocols, as well as a device for implementing the method.

The invention applies notably to the securing of communications over a remote network such as, for example, the Internet or telephony network, notably for online banking, online payment, online administration, online health or any other type of transaction requiring significant reliability and security like Intranet and Extranet access. By extension, the invention applies also to the Internet of things, to local or remote communications with machines (M2M, machine to machine) as well as the authorized users of these machines.

The invention aims to provide a security infrastructure capable of handling the functions of authentication security and confidentiality as well as the cryptographic electronic signature technique.

The security of a cryptographic system using an asymmetrical algorithm relies in large part on the management of the public keys.

As soon as a cryptographic system has a large number of users, a key management infrastructure has to be implemented. The PKIs are created to render the asymmetrical cryptography (key pair) operational in the real world.

The PKI is generally defined as a set of technologies, organizations, procedures and practices which supports the implementation and the operation of certificates based on public key cryptography.

Public key cryptography faces an extremely difficult problem: how to guarantee the validity of the public keys? As soon as a user wants to encrypt a message using an asymmetrical algorithm or check a signature, he or she has to obtain the public key of the other party (the recipient of the message) or that of the signatory. If the public keys are stored in unsecured directories, they risk being intercepted and/or replaced by other keys. It is therefore possible to fabricate false signatures simply by replacing the public key of a user.

This crucial problem for all public key cryptography can be resolved by introducing a trusted third party, called certification authority (CA), which validates the link between the identity of the users and their public keys. Formally, a public key certificate consists of a plain text and a signature. The plain text contains in particular a public key and a character string identifying the owner of this key. The signature corresponds to the digital signature of the preceding plain text by the CA. If this signature is authentic, it proves that the CA validates the link between the identity of a user and its public key.

PKIs are known in which the cornerstone of the security of the public key is ensured by a certification authority (CA). An CA is a trusted third party for the generation, the signing, the publication and the revocation of the public key certificates.

There are currently two major types of PKI architectures: the hierarchical architectures and the non-hierarchical architectures. A hierarchical architecture relies on different certification authorities (CA) which are distinct from the users. A non-hierarchical architecture relies on mutual trust between the users, and each user is in effect his or her own CA. These two types of PKI architectures are notably cited in a 2008 IEEE publication entitled "Risk management of digital certificates in ad hoc and P2P networks" (Tong Zhou and Lein Harn).

In the hierarchical model, the Public Key Infrastructure X.509 (PKIX) is known as a system described in ISO/IEC 9594-8 and in ITU-T recommendation X.509, in which the public key of a user is certified by an authority whose public key is in turn certified by a higher authority.

In practice, a "recognized" or "international" hierarchical PKI in effect confers on specialist third party companies—certification authorities (CA) like "Verisign", "Entrust", "Thawte", "Keynectis", "CertiNomis", etc—the task of certifying the public key of an entity or of an individual. These companies, because they are recognized certification authorities, guarantee and ensure the validity of a public key and above all that it belongs to its legitimate owner from any Internet browser or, for example, email software. Thus, the use of the public key certificate becomes safe.

In practice, an "internal" hierarchical PKI in effect replaces the abovementioned third party certification authorities (CA) with its own organization. In other words, an entity that is big enough can deploy its own internal architecture, thereby becoming its own registration authority (RA) and its own CA for its members ("client" certificates). This solution is often deployed for an internal use in large companies and administrations.

These two "recognized" and "internal" hierarchical PKIs are proven when it comes to security (cryptography). They are also viable technologically, organizationally and economically. However, each is suited to a particular context which does not correspond to the need for a widescale deployment to individuals, whether citizens, consumers and/or professionals.

At the open discussion on Feb. 15, 2011 of the $20^{th}$ American edition of the RSA conference in San Francisco, Mr. Art Coviello, the CEO (chief executive officer) of RSA, the security division of EMC, reviewed some of the less inspired episodes in the computer security sector, including that concerning PKI. With supporting graphics, Mr. Art Coviello showed how, in the space of a decade, PKI had intrigued, seduced, excited and ultimately disappointed the expectations. He then drew a parallel between the keen interest in public key infrastructures in 2000 and that in cloud computing today. However, according to him, any similarity stops there: "The cloud is not a fashion like PKI was. No: unlike the latter, which excited a lot of talk about it but was rarely deployed in the field, cloud computing is transforming businesses as of now".

The certification authorities are centralized. This poses problems of practical organization and of security for the registration and delivery of the certificates to numerous users coming from various fronts.

The stumbling point in the hierarchical PKIs is the certification authority at the point when they address a large number of users as is the case of physical people or individuals, whether they are citizens, consumers and/or professionals.

In practice, the certification authorities of the "international" PKIs do not have proximity registration agencies for enrolling the users satisfactorily (the necessary physical presence) and impose a not inconsiderable annual fee for each individual. In this context, there are millions, even billions, of them.

Moreover, when issuing a certificate remotely (which is often the case), the certification authority enrolls the users before certifying their public key. There is therefore a confusion of the roles, since the enrollment is normally devolved to a registration authority.

The invention proposes a non-hierarchical PKI, that is to say one without a certification authority that is distinct from the users, in order for the system to be centered on the individual (citizen/consumer/professional). The proposed organization comprises numerous proximity agencies distributed over the territory in order to facilitate access to enrollment and to guarantee security through "face-to-face" procedures.

In the non-hierarchical model, systems without external certification authority are known, like the Pretty Good Privacy (PGP) system, in which the public key of a user is certified by him- or herself and also by other users. This architecture rests on trust. The public key of a user is accepted because it is signed by a person whose key is itself signed by someone that is known and that is trusted.

Other non-hierarchical systems exist, like Simple Public Key Infrastructure (SPKI) familiarly called "Spookey" and Simple Distributed Security Infrastructure (SDSI) familiarly called "Sudsy" which merged in 1996. These systems, however, remain limited because they address only restricted groups of individuals and are difficult to deploy on a very large scale.

As is clearly explained in an article published on Wikipedia® on this topic, the SPKI/SDSI model does not define any role for a commercial certification authority (CA). In fact, one SPKI premise is that a commercial CA is of no use. Consequentially, the SPKI/SPSI architecture is deployed mainly in closed solutions and in academic demonstration projects. Another secondary effect of this model is that it is difficult to monetize an SPKI/SDSI infrastructure by itself. It may be a component of another product, but there is no cost-effectiveness analysis for the development of SPKI/SDSI tools and services, except in the context of another product.

Also known is the following patent, WO 03/046748 A1 (VISIONSHARE INC [US]) dated Jun. 5, 2003, in which the structure described does not include any certification authority but common directories that can contain public key certificates originating from a plurality of distinct entities and in which a public key certificate is established by a local registration agency. The pooling in the same directory of identities (and of their associated credentials) of persons coming from legally distinct entities is, however, likely to pose problems.

Also known are the following patents, U.S. 2002/0150241 A1 (SCHEIDT EDWARD [US] ET AL) dated Oct. 17, 2002, and WO 2007/006008 A2 (MICROSOFT CORP [US]) dated Jan. 11, 2007, in which the architectures described use a notary and self-signed certificates, but they do not make it possible to ensure an adequate level of security.

The invention therefore aims to improve the architectures, the structures, the methods and the procedures previously cited to make it possible for numerous users to be authenticated, to sign transactions, to encrypt messages easily and at minimal cost.

The invention consists of a novel PKI, called "2.0" or "PKI2.0", constructed on three levels. The aim of this novel PKI is to provide a large number of individuals, citizens/consumers/professionals from diverse fronts, the cryptographic security means necessary to trust in digital life. The invention makes it possible for numerous physical persons with diverse expectations to be authenticated, to sign transactions, to encrypt messages easily and at minimal cost.

The problem does not arise in the deployment, the management and the use of the "server" certificates which are well managed by the "recognized" hierarchical PKI at the third level. The problem arises rather in that of the "client" certificates, that is to say those intended for the registration agents on the one hand (second level), and for the individuals on the other hand (third level).

The invention therefore proposes a second level for managing the client certificates of the registration agents by an "internal" PKI: one for each player in a trust circle such as, for example, a bank or a telecommunications operator.

The invention also proposes a first level for dealing with the case of the citizen/consumer/professional individual with the innovation of the so-called "user" non-hierarchical PKI.

The proposed infrastructure therefore comprises three levels: a "recognized" (or "international") PKI for issuing and managing the server certificates of the identity providers (IDP), of the attribute providers (AP) and of the service providers (SP); an "internal" PKI deployed by the registration authorities for their local agencies; and a "user" PKI for the citizen/consumer/professional individual.

In order to ensure a maximum efficiency for a minimal cost by taking the best of each PKI, the PKI "2.0" (PKI2.0) with 3 levels consists in deploying: at the third (top) level, a "recognized" (or "international") hierarchical PKI to a minimum of players; at the second (intermediate) level, as many "internal" hierarchical PKIs as there are registration authorities (limited number of players); at the first level, the non-hierarchical "user" PKI for the citizen/consumer/professional individual (very numerous players).

The 3-level PKI "2.0" therefore defines a novel organization which becomes possible by virtue of a multi-level architecture on the one hand, and the cryptographic protocols of the non-hierarchical "user" PKI addressing the users of the first level on the other hand.

According to the invention, the PKI "2.0" recommends installing the third level of a "recognized" hierarchical PKI with the mission of issuing and managing the "server" certificates of the central players.

The central players of an identity management architecture are the identity providers (IDP IDentity Provider, IP/STS Identity Provider/Security Token Service), the attribute providers (AP) and the service providers (SP Service Provider, RP Relying Party). These players have to communicate with one another securely.

These central players move around in distinct trust circles. The trust circles are, for example: 1) the royal circle, 2) the territorial communities circle, 3) the health circle, 4) the banking, finance and insurance circle, 5) the Internet and telecommunications circle. The trust circles can also be private circles corresponding to a business, an organization or a group of persons or of items.

According to the invention, the PKI "2.0" recommends installing, at the second level, registration authorities (RA) with the mission of integrating the citizens/consumers/professionals in the system. They serve as proximity intermediaries in each of the trust circles.

The registration authorities handle two main functions: proximity agent and trusted third party. Their role is to issue the "client" certificates of the citizens/consumers/professionals. The registration authorities (RA) have to fulfill three conditions. Firstly, the RAs have to have enough proximity agencies distributed relatively uniformly over the territory and the different population areas to constitute good proximity agents. Secondly, the RAs have to be able to be recognized and accepted by the citizen/consumer/professional individual as trusted third party (repute, respectability, legal recognition). Thirdly, the RAs have to be authorized by each of the trust circles to be a trusted third party of said circle.

The PKI "2.0" proposes putting in place networks of local registration agencies (LRA) in the real world, for each trust circle. In the royal circle: family notaries, bailiffs, etc. In the territorial community circle: town halls, post offices, etc. In the health circle: sickness insurance funds, pharmacies etc. In the banking, finance and insurance circle: bank branches, insurance agent offices, etc. In the Internet and telecommunications circle: telecommunication operator agencies, etc. A trust circle may also be a private circle corresponding to a company, an organization or a group of persons or of items. A local registration agency may also be a roaming service and go to places of public, private or working life to securely register persons or items.

According to the invention, the PKI "2.0" recommends putting in place, at the first level, a non-hierarchical "user" PKI to serve the citizen/consumer/professional individuals.

The cryptographic protocol of the "user" PKI is liberated from a certification authority to the benefit of an electronic notary.

In the crypto system of the "user" PKI, the choice of the type of asymmetrical algorithm is immaterial, whether it is based on the factoring of large numbers into two prime numbers ("RSA", "Rivest Shamir Adleman"), on stack logics, the computation of discrete logarithms or even on elliptical curves (ECC, Elliptic Curve Cryptography, a variant of discrete logarithms). However, only algorithms of RSA type make it possible to produce an encryption with a private key by an atypical use of that key. In this case, it will be possible, if necessary, to render the "public key ownership certificate" opaque. The particular structure of the keys in the elliptical curves (scalar for the private key and point of the curve for the public key) does not allow for such an atypical use of the private key. In this case, the sealing of the "public key ownership certificate" can be done only by signature.

The cryptographic protocol of the "user" non-hierarchical PKI is based: on the one hand on a public key certificate self-signed by the user, that is to say signed with his or her own private key and, on the other hand, on a "public key ownership certificate" self-sealed by the user, that is to say, either signed with the private key of the user, or encrypted with the private key of the user according to an atypical use of this key in order to render it opaque (apart from its number).

The non-hierarchical PKI model according to the invention differs from the known non-hierarchical systems (PGP and SPKI/SDSI) in that there are no signatures of other users in the public key certificate of the user. Moreover, neither in PGP, nor in SPKI/SDSI, is there any "public key ownership certificate" self-sealed by the user according to the invention.

According to the invention, classified in the category of the non-hierarchical models, the person certificates associating a public key with its legitimate owner (called "public key certificates") can be consulted directly by all the players. No certification authority is necessary since the person certificate is self-signed. This self-signature does not of course provide any guarantee as to the validity of the public key certificate. However, it makes it possible to make this certificate conform to the X.509v3 standard in order to be able to be used by the existing applications, written for the hierarchical model.

Unlike the hierarchical PKI with certification authority, a player is able to check the validity of the public key certificate of a person by the correct execution of a cryptographic protocol between this player and the server of the electronic notary. This protocol directly involves the use of this key. If the ownership certificate is opaque, it is the correct opening, by the public key to be checked, of this ownership certificate that can be consulted online in the database/directory of the electronic notary and the verification of its hash value which ultimately attest to the validity of this same key. If the ownership certificate is legible, it is the correct verification, by the public key to be checked, of the signature of this ownership certificate that can be consulted online in the database/directory of the electronic notary and the verification of its hash value which ultimately attest to the validity of this same key.

In the hierarchical PKIs, the person certificate must be first signed by a certification authority (CA) that has its own "root" certificate pre-embedded in the Internet browsers. If the signatory CA is exotic and not recognized, the player is unable to check the validity of the public key presented in the person certificate. According to a Wikipedia® source, "The root certificates are unsigned public keys, or self-signed but worthy of trust. Commercial certification authorities hold root certificates present in many software packages, such as, for example, the browsers like Internet Explorer® or Firefox® contain pre-installed root certificates. When the browser opens a secure connection (SSL/TLS) to a site that has bought a certification from a recognized authority, it considers that the site is safe, and the switch to secure mode is transparent. If the certificate is self-signed (certification authority and creator of the public key are one and the same), the browser prompts to examine it, then to accept or deny it depending on the trust that is granted to it."

According to the invention, the "user" non-hierarchical PKI proposes that any player connected to the Internet is able to check the validity of a proposed or recovered public key. For this, the player must interrogate the electronic notary (specified in the public key certificate) by sending a request to the online electronic notary server (the address of which is specified in the public key certificate).

In the event of temporary unavailability of the server of the electronic notary containing the corresponding "public key ownership certificate", the system is not necessarily blocked although the security response is deferred. In practice, there is nothing to prevent a player from using the public key of a person all the same, if it decides to trust that person. It may, for example, encrypt a message intended for that person or else check a document, a message or a transaction signed by that same person.

On the scale of a country like France, the PKI "2.0" reduces to a few tens the number of electronic notary servers to be administered and to be protected in order to ensure the overall infrastructure of the public keys of the persons on the planes of e-commerce (B to C), of e-administration and of private exchanges. That is both a number that is sufficient to avoid a strong attack concentrated on a single point and sufficiently small to not complicate the management of the whole.

Today, it is already possible to ensure a very high level of availability and integrity of the strategic servers, as is already the case for the servers of the big web players. There is therefore no infrastructure overhead associated with the innovation presented.

In the case of the "user" non-hierarchical PKI, the keys and the certificates relate individually to the physical persons. "Client" certificates or "person certificates" are commonly referred to in order to distinguish them from the "server" certificates. According to the terms of the general security repository (RGS) published by the French National Information Systems Security Agency (ANSSI), "A "server" electronic certificate is an electronic file certifying that a key pair [private key and its associated public key] belongs to the administrative authority identified directly or indirectly in the certificate. It is issued by a certification authority. By signing the certificate, the certification authority validates the link between the administrative authority, the Internet domain name of the server and the key pair. The certificate is valid for a given duration specified in it. This "server" certificate and this key pair will enable the server that has them and that is acting on behalf of this administrative authority to be authenticated to a "user" station (SSL/TLS in client/server mode) or to another server (Web services). In this context, the term server does not designate the machine itself but the application server or the service or the remote service running on a machine." In a hierarchical PKI, according to the terms of the general security repository (RGS): "An "individual" electronic certificate is an electronic file certifying that a key pair belongs to the physical person identified directly or indirectly (pseudonym) in the certificate. It is issued by a certification authority. By signing the certificate, the certification authority validates the link between the identity of the individual and the key pair. The certificate is valid for a given duration specified in it."

In the context of the present invention, the physical persons concerned are citizens/consumers/professionals, that is to say individuals.

For example, in case of deployment of the present invention in France, at the royal circle level, this individual must be a French citizen. A foreigner will have to be enrolled by the royal registration authority of his or her home country. For the "banking, finance and insurance" and "Internet and telecommunications" circles, the notion of proximity becomes the rule. For the citizens of the European Union, the possession of a bank account in a French bank or of a contract with a French telecommunications operator is sufficient to legitimize their enrollment by the corresponding registration authority. The present invention is likely to be applied in any country but also, by extension, in any community.

The present invention does not change the use of the cryptographic keys. The private keys and the public key certificates of a person will enable him or her: to be authenticated with a server (application server, service or remote service running on a machine); to encrypt a document in order to ensure confidentiality with respect to all, except himself or herself; to sign a document, a transaction or a message. The public keys and the public key certificates of the other persons will enable a given person: to authenticate another individual, an employee, an agent or a server; to encrypt a document, a transaction or a message to another individual, an employee, an agent or a server (confidentiality); to check the signature affixed to a document, a transaction or a message by another individual, an employee, an agent or a server.

Beyond the citizen/consumer, this system extends to physical persons of other entities. For businesses, public key ownership certificates of welfare representatives, accountants, treasurers, payroll managers, etc. can be issued by the commercial courts. For merchants and craftsmen, they will be able to be issued by the guild chamber. For the liberal professions, they would be issued by the guild chamber or the professional orders (advocates, accounting experts, auditors, doctors, etc.). For employees or civil servants, when involved by name (and not in the context of their respective function) they would be issued by the industrial tribunal or else social security.

Beyond the citizen/consumer/professional, this system can also be applied to entities or items other than physical persons, like animals, plants, machines, appliances and objects. Obviously, the enrollment of these items will not necessarily entail verifying an identity document but rather verifying an identification.

The life cycle of a key and of the associated person certificates comprises a number of phases: 1) application, 2) generation, 3) assignment, 4) introduction, 5) use, 6) end of life, 7) renewal and 8) recovery.

1) Application. The individual must apply explicitly or implicitly for the creation, for his or her own personal use, of cryptographic keys and of the corresponding certificates. This application corresponds to the start of the life cycle of a key and of a certificate. Formalization of this application may be useful in tracking the key or the certificate in its life cycle. The individual is not necessarily aware of the interest or the use of having keys and cryptographic certificates to profit from the Internet services. The notion of "security key for Internet" is perhaps easier to understand. This application corresponds to a deliberate application on the part of the individual. It may, however, be proposed to the user in a local registration agency (LRA), for example when taking out a cell phone subscription. On this occasion, the cell phone, the "smartphone" or the tablet may become the favored storage medium for the public key certificate and the private key of the user.

2) Generation. The key generation operation depends on the cryptographic algorithms used. The certificate generation operation depends on the standards adopted. The generation of the keys can be performed in an individual, decentralized or centralized manner. Individual generation: the individual locally uses a software tool made available to him or her in the identity selector of his or her computer, in his or her cell phone or his or her "smartphone". Decentralized generation: the individual goes physically to his or her local registration agency (LRA) which proceeds, on behalf of the individual, to generate his or her keys. Centralized generation: a registration authority common to all individuals—at least one for each trust circle—generates the keys of each individual and is responsible for delivering them to those individuals. Individual generation is private with the individual's total control. The absence of Internet connection is recommended during the generation process. It does, however, require well-informed users. Decentralized generation is performed in a trust environment. The individual is nevertheless present during the generation process. In this case, the individual must trust a third party (the LRA by delegation from its registration authority) for the generation of his or her secret and private items. Centralized generation is performed with no control on the part of the individual. This scheme is not ideal for reassuring the individuals. Furthermore, the operation of issuing of the keys (once generated) to each individual involves heavy and costly logistics. This procedure does not appear to be most optimal, either for user perception or for deployment cost.

The random key generation can be done in two ways: indirectly by the key derivation method, directly by a random generator. Key derivation consists in using a cryptographic method to obtain, from a so-called master key and public information identifying the final user, a secret or private key. This method is deprecated because it weakens the security (the security is then limited to the entropy and the complexity of the master key which is generally a password that can be remembered and is therefore rather short and weak).

Random key generation consists in using a random generator to construct the secret, private and public keys by a cryptographic method. Taking good care to be offline, that is to say unconnected from any network and from the Internet, the individual, who we will call, for example, Alice, uses this program to generate, in her home (or at the local registration agency), her pair of keys or key pair: one private and one public: $K_{pri}A$ and $K_{pub}A$, where A corresponds to Alice, $K_{pri}$ to the private key and $K_{pub}$ to the public key.

3) Assignment. Once the crytographic key is generated, its admission into the information system is an operation that is crucial in terms of security. This operation associates with a numeric value the identity of the individual to which it is assigned and the usage that is devolved to it (signature, encryption, key exchange, etc.). For security reasons, the separation of the authentication and signature usages is recommended.

The "user" non-hierarchical PKI recommends, for each individual, the storage on a physical authentication and signature medium of two key pair pairs: the first for authentication (with presumption of reliability); the second for the electronic signature in order to validate a transaction by marking consent.

The two private keys are stored securely: either by being encrypted and stored in a memory with free access, or by being stored unencrypted in a secure memory with access control, or by being stored encrypted in a secure memory with access control. The latter case is preferable.

The self-signed X.509v3 public key certificates are stored unencrypted. The first is an authentication certificate. The second is a signature certificate whose legal value devolves from European Directive 1999/93.

The assignment operation becomes crucial when it involves the first admission into the system. In this case, it is the first enrollment of the individual in a system. As the ANSSI stipulates in the RGS: "The security of the operation may result only from non-cryptographic methods, of a physical and organizational nature. It is in this first enrollment that the individual will be assigned the first cryptographic elements that will subsequently enable him or her to be recognized safely and him or her to be assigned new keys." This is what the present invention seeks to address, in order to guarantee an enrollment that is said to be "face-to-face" and not remote by telecommunication or by correspondence.

The certificate generation operation depends on the standards adopted. The generation of the certificates can also be performed in an individual, decentralized or centralized manner. Individual generation: for the public key certificate which is no longer signed by a certification authority, the individual locally uses a certified software tool made available in the identity selector of his or her computer or in his or her cell phone. Decentralized generation: the individual goes physically to his or her local registration agency which proceeds, on behalf of this individual, to create his or her public key certificate and his or her "public key ownership certificate". Centralized generation: a registration authority common to all individuals—at least one per trust circle—generates the certificates of each individual and is responsible for their delivery.

The "user" non-hierarchical PKI does not recommend the centralized procedure for three reasons: it is performed with no control by the individual (this scheme is not carried out to reassure the individuals); the operation of issuing of the certificates (once created) to each individual involves heavy and costly logistics; it is difficult for the individual to prove his or her identity to the geographically remote registration authority. In practice, the sending of photocopies of identity documents by mail, the sending of a bitmapped version of identity documents by email, and the faxing of identity documents can be easily compromised.

The individual procedure is perfectly capable of making it possible to create a public key certificate that is self-signed, but not taken over by a certification authority as provided for in the "user" PKI protocol. It does not make it possible to create a "public key ownership certificate". Above all, it does not make it possible to introduce it into the system because it cannot be published on an electronic notary server. The "user" PKI does not recommend this procedure.

The decentralized procedure makes it possible to create a public key certificate that is self-signed, not signed by a certification authority as provided for in the "user" PKI protocol. It also makes it possible to create a "public key ownership certificate" with verification of its authenticity. It also allows for its introduction into the system (publication on the electronic notary server). The "user" PKI recommends this procedure.

The individual (Alice) goes physically to her local registration agency (LRA). It is there that Alice will be able to obtain two certificates: her public key certificate and her "public key ownership certificate".

The present invention proposes a three-step process.

First step, the individual Alice presents one or more identity documents (passport, national identity card, driving license, etc.) to the registration agent who validates them and physically authenticates Alice. This identity verification step is essential in establishing a true trust system. By contrast, a "recognized" (or "international") PKI may find it difficult to propose this physical approach to all because it does not have proximity local registration agencies distributed throughout the territory.

Second step, the individual Alice uses the (certified) certification program of the local registration agency (LRA) to generate her public key certificate. This certificate is legible and self-signed by Alice's private key.

This public key certificate contains in particular: {serial number, nationality of third party (for example FR), type of third party (=registration authority), nature of third party (for example bank, insurance or telecommunications operator, etc.), trust circle of third party, identity of third party, identity of LRA, URL of the third party's electronic notary server, date and time stamp, identity of Alice, $K_{pub}A$, +signature of the LRA+self-signature}. This certificate follows the X.509v3 format for compatibility with the international standard.

Third step, the individual Alice uses the (certified) program of the local registration agency (LRA) to guarantee the legitimate ownership of its public key that Alice has added to her USB key, her chip card or her cell phone (individual generation procedure), or that Alice has just generated at the LRA (decentralized generation procedure). The registration agent inputs into the program the identity of the individual Alice (for example Alice's first and last name, her date and place of birth, her nationality) and specifies the respective positions of Alice's public key and private key (by pointing to the corresponding files in Alice's USB key, chip card or cell phone).

The program computes the hash value (e) of Alice's public key with, conventionally, a one-way hash function such as RIPE-MD or SHA-256 or else, atypically, with any other means of obtaining a value representative of Alice's public key without any way revealing it: $H(K_{pub}A)=e_{pub}A$, with H being the one-way hash function or any other function for computing a representative value.

The public key ownership certificate is then composed as follows: {serial number, nationality of third party (for example FR), type of third party (=registration authority), nature of third party, trust circle of third party, identity of third party, identity of the LRA, date and time stamp, identity of Alice, $e_{pub}A$}.

This ownership certificate is then sealed with Alice's private key, either by signature or by encryption with atypical usage of the private key which renders it opaque (that is to say encrypted with Alice's private key), said private key being stored in her USB key, her "SD-card", her chip card, her cell phone, her "smartphone" or any other storage device suited to this need, and never shown to the registration agent.

The "user" PKI establishes the responsibility of the individual (citizen/consumer/professional) and arranges for the individual to certify the ownership of his or her public key himself or herself, under the control of a registration authority (represented by his or her local registration agency) but without the intervention of any certification authority.

That gives, if we take the option of encryption with an asymmetric algorithm of RSA type: $E(K_{pri}A, \{$nationality of third party (for example FR), type of third party (=registration authority), nature of third party, trust circle of third party, identity of third party, identity of the LRA, date and time stamp, identity of Alice, $e_{pub}A\})$. The certificate is then made up as follows: serial number+[nationality of third party (FR), type of third party (registration authority), nature of third party, trust circle of third party, identity of third party, identity of the LRA, date and time stamp, identity of Alice, $e_{pub}A$]. Notation: E asymmetrical encryption algorithm; { } signifies an open and legible certificate; [ ] signifies and opaque and sealed certificate (that is to say encrypted therefore illegible as is).

That gives, if we take the option of signature with an asymmetrical algorithm of RSA type: Sig $(K_{pri}A, \{$serial number, nationality of third party (for example FR), type of third party (=registration authority), nature of third party, trust circle of third party, identity of third party, identity of the LRA, date and time stamp, identity of Alice, $e_{pub}A\})$. The certificate is now made up as follows: serial number+{nationality of third party (for example FR), type of third party (=registration authority), nature of third party, trust circle of third party, identity of third party, identity of the LRA, date and time stamp, identity of Alice, $e_{pub}A\}$+self-signature. Notation: Sig signature algorithm (asymmetrical); { } signifies an open, legible and sealed certificate (that is to say signed).

That gives, with an asymmetrical algorithm of ECC (elliptical curve) type: Sig $(K_{pri}A, \{$serial number, nationality of third party (for example FR), type of third party (=registration authority), nature of third party, trust circle of third party, identity of third party, identity of the LRA, date and time stamp, identity of Alice, $e_{pub}A\})$. The certificate is now made up as follows: serial number+{nationality of third party (for example FR), type of third party (=registration authority), nature of third party, trust circle of third party, identity of third party, identity of the LRA, date and time stamp, identity of Alice, $e_{pub}A\}$+self-signature. Notation: Sig signature algorithm (asymmetrical); { } signifies an open, legible and sealed certificate (that is to say signed).

According to the mathematical structure of the asymmetrical algorithms used other than RSA and ECC, it will be possible either to sign or encrypt as in the RSA case, or only to sign as in the ECC case.

The present invention institutes a physical person individual "public key ownership certificate" with the following features: it does not contain the public key of this individual but only the hash value of that key; it is sealed with the individual's own private key and is not signed with the private key of any certification authority.

4) Introduction. According to the ANSSI RGS, "once its role has been correctly defined, another aspect of the management of a key consists in physically or logically introducing it into the application system as a whole. This aspect covers the distribution and the transport of the key to the user or to the equipment, then its possible injection into the individual's trust environment. Introduction is therefore the operation which has the key assigned to the key management system proper transferred to the application system which will use it."

The individual now has his or her private key and his or her public key certificate on his or her key media.

The present invention creates an automatic module, incorporated in the identity selector or in the certified program of the LRA, the function of which is to publish to the identity providers and the directories the new public key (public key certificate) of the individual in order to rapidly integrate trust in his or her digital life.

According to the present invention, the registration agent, a member of the LRA, has the task of publishing the "public key ownership certificate" of the individual on the electronic notary server of the registration authority to which it belongs.

According to the present invention, the electronic notary server contains a centralized directory (or a database) of all the "public key ownership certificates" of the individuals served by the proximity network of its local registration agencies.

According to the present invention, each of the records of this database comprises an index value of the certificate (the number of the certificate), the public key ownership certificate and a hash value of the two above values encrypted by the private key of the electronic notary. This private key of the electronic notary is linked to a certificate issued by the internal certification authority of the registration authority to which the server belongs. This signature makes it possible to preserve the integrity of the directory. In these conditions, the public key of each of the electronic notary servers (certified by a recognized certification authority) then makes it possible to verify that a record of its database/directory is indeed authentic and not an addition or a substitution made fraudulently by a hacker.

According to the present invention, all of the directory or database of all the "public key ownership certificates" of the electronic notary server can also be signed with its private key after each legitimate update, which renders the malicious deletion or modification of an existing ownership certificate and the addition of a fraudulent ownership certificate difficult.

According to the present invention, the registration agent forms part of the "internal" hierarchical PKI of his or her registration authority. This enables him or her to sign his or her transmittal to the electronic notary server that he or she has previously authenticated, in order to publish the "public key ownership certificate" of the individual in total security. The electronic notary therefore publishes only the "public key ownership certificates" of individuals issued by its own authorized registration agents. For example, an "internal" PKI already exists for notaries in France (royal circle).

The security of the exchanges between the LRA and its electronic notary server is assured in that: a) the electronic notary server is authenticated by the LRA by virtue of the public key certificate of said server, issued by itself (internal PKI); b) the LRA is authenticated by the electronic notary server by virtue of the public key certificate of said LRA, issued by the registration authority (internal PKI); c) the confidentiality of the exchanges is obtained by encryption of the data transmitted, for example by virtue of the TLS 1.x protocol (transport layer security, a standard for securing by encryption the transport of information in computer networks, formerly SSL Secure Socket Layer), initiated by the server.

5) Use. According to the ANSSI RGS, "By their very nature, the private or secret elements can be employed only in a trust environment. This environment is in fact responsible for the storage of the keys and for their correct management for the duration of their use. There may in particular devolve therefrom requirements as to the protection of the application trust environment." There are three types of use of the keys: encryption/decryption for confidentiality, electronic signature, authentication (by asymmetrical cryptography, by single-use password or one time password, OTP).

How the encryption/decryption process unfolds for confidentiality in the present invention. According to the present invention, a request module is provided which takes as input the public key certificate of the physical person, interrogates the electronic notary server whose address (for example URL) is included in said public key certificate, by communicating the number of this public key certificate and the public key certificate, and which receives in return, from the electronic notary server whose address is included in said public key certificate, an assertion as to the authenticity or the non-authenticity of the public key certificate presented and an assertion as to the authenticity or the non-authenticity of the alleged public key of the physical person.

According to the present invention, the request module is placed, for example, in Internet browsers, email software, identity provider servers (IDP, IP/STS), computer applications, computer processes. According to one embodiment, the Internet browsers, the email software, the identity provider servers (IDP and IP/STS), the computer applications, the computer processes, embed the public key certificates of the legitimate electronic notary servers.

According to the present invention, a response module is provided which is installed on all the electronic notary (EN) servers, which receives as input the request from the request module, which searches in the database of said EN server to see if there is a "public key ownership certificate" number identical to the public key certificate number received and which delivers a "the public key is not authentic" assertion if the result of the search is negative.

According to the present invention, a response module is provided which is installed on all the electronic notary (EN) servers, which receives as input the request from the request module, which searches in the database of said EN server to see if there is a public key ownership certificate number identical to the public key certificate number received, in that, if the result of the search is positive, this response module makes either an attempt to decrypt the "public key ownership certificate" found if it is opaque with the public key received and delivers a "the public key is not authentic" assertion if the decryption does not succeed or a "the public key is authentic" assertion if the decryption succeeds, or a verification of the signature of the "public key ownership certificate" found if it is legible with the public key received and delivers a "the public key is not authentic" assertion if the verification fails or a "the public key is authentic" assertion if the verification succeeds.

According to the present invention, a response module is provided which is installed on all the electronic notary (EN) servers, which receives as input the request from the request module, which searches in the database of said electronic notary server to see if there is a public key ownership certificate number identical to the public key certificate number received, in that, if the result of the search is positive, said response module makes either an attempt to decrypt the "public key ownership certificate" found if it is opaque with the public key received, or a verification of the signature of the "public key ownership certificate" found if it is legible with the public key received, in that, respectively, either if the decryption succeeds, or if the verification of the signature succeeds, said response module computes the hash value of the public key received, then compares it with the hash value of the public key stored in the public key ownership certificate previously decrypted and in that said response module delivers a "the public key is not authentic" assertion if the two hash values are different or a "the public key is authentic" assertion if the two hash values are identical.

Here are the steps according to the invention, when an individual, called Bernard, or a service provider (SP/RP) wants to send a secret message to another individual called Alice.

Bernard obtains Alice's public key certificate: either by consulting an identity provider (IDP/IP) of his trust circle, or by consulting one of the public key certificate directories where Alice has already published it, or directly from Alice. Bernard must now check that this public key "$K_{pub}X$" written in Alice's public key certificate is indeed Alice's and that a hacker has not already been there to substitute his or her own public key for that of Alice (or else by the notorious interceptor attack, also called "man-in-the-middle"). Bernard first recovers the number of the certificate and the public key "$K_{pub}X$" that is legible in the certificate, allegedly that of Alice. Bernard sends a request in real time to the server of the electronic notary (EN) indicated in the public key certificate to consult Alice's "public key ownership certificate" which is normally stored therein. If there is no "public key ownership certificate" for Alice on the EN server indicated (no correspondence for the certificate number in the database or the directory), the validity of Alice's public key in Bernard's possession is unproven. If Alice's "public key ownership certificate" does indeed exist on the EN server indicated (correspondence of the certificate number in the database or the directory), this certificate is either opaque, or legible. The request sent by Bernard will use "$K_{pub}X$" to try to open it if it is opaque or to check its signature if it is legible. If the public key ($K_{pub}X$) recovered in Alice's public key certificate is indeed Alice's original public key ($K_{pub}A$), then the "public key ownership certificate" is opened if it is opaque, unlike any other false public key which will not be able to open the certificate, or else have its certificate verified if it is legible.

According to the present invention, the server module then computes the hash value of the public key received in the request: $H(K_{pub}X)=e_{pub}X$. This value is then compared with the hash value stored in Alice's "public key ownership certificate" which has just been opened or for which the signature has just been verified. If the two hash values match ($e_{pub}X=e_{pub}A$) then the response to the request from Bernard specifies that the public key sent in his request is indeed Alice's original public key, "certified" (sealed to be exact) by herself and guaranteed by the server of the electronic notary.

Thus, Bernard is truly sure that he has indeed recovered Alice's authentic public key. All he now has to do is to encrypt his secret message for Alice with Alice's authentic public key and rely with confidence on the fact that only Alice does indeed have the unique private key ($K_{pri}A$) capable of correctly decrypting his message. The confidentiality of the message from Bernard for Alice is then guaranteed.

The security of the exchanges between the requesting client and the electronic notary (EN) server is assured in that: a) the EN server is authenticated by the client by virtue of the public key certificate of said server, issued by a recognized certification authority; b) the confidentiality of the exchanges is obtained by the encryption of the data transmitted, for example using the TLS 1.x protocol, initiated by the server; c) the integrity of the URL of the EN server contained in the public key certificate can be verified by the signature of said certificate.

How the electronic signature process unfolds in the present invention.

Here are the steps according to the invention, when a player (an individual, called Bernard, or a service provider (SP/RP) wants to verify the signature of another individual called Alice. This entity needs Alice's authentic public key in order to verify her signature on a transaction. This transaction has been date and time stamped and signed with Alice's private key. The entity obtains Alice's public key certificate: either by consulting an identity provider (IDP/IP) of its trust circle, or by consulting one of the public key certificate directories where Alice has already published it, or directly from Alice. The entity must now check that this public key "$K_{pub}X$" written in Alice's public key certificate is indeed Alice's and that a hacker has not already been there to substitute his or her own public key for that of Alice (or else by the notorious interceptor attack, also called "man-in-the-middle").

The process of verifying the validity of Alice's public key is exactly the same as that detailed in the preceding case. On completion of these steps, the entity is truly sure that it has indeed recovered Alice's authentic public key. The entity now only has to check Alice's signature with Alice's authentic public key and rely with confidence on the fact that only Alice does indeed have the unique private key ($K_{pri}A$) capable of having correctly signed the transaction concerned. The signing of the transaction by Alice is then guaranteed.

How the process of authenticating Alice using the asymmetrical cryptography in the present invention proceeds.

Here are the steps according to the invention, when a player (an individual, called Bernard, or a service provide (SP/RP) wants to verify the signature of another individual called Alice. This entity needs Alice's authentic public key to verify the encryption applied by Alice's private key in a challenge-response protocol. After a first phase of identifying Alice with the server of the entity, the server sends a random datum (the challenge) to Alice who encrypts it with her private key ($K_{pri}A$) to obtain the response that she sends to the server. To decrypt the response obtained and retrieve its original challenge, the server needs Alice's public key. The entity obtains Alice's public key certificate: either by consulting an identity provider (IDP/IP) of its trust circle, or by consulting one of the public key certificate directories where Alice has already published it, or directly from Alice. The entity must now check that this public key "$K_{pub}X$" written in Alice's public key certificate is indeed Alice's and that a hacker has not already been there to substitute his or her own public key for that of Alice (or else by the notorious interceptor attack, also called "man-in-the-middle").

The process of verifying the validity of Alice's public key is exactly the same as that detailed in the preceding case. On completion of these steps, the entity is truly sure that it has indeed recovered Alice's original public key. The entity now only has to decrypt the response (to the challenge) sent by Alice with Alice's original public key. If the duly decrypted value is the same value as the random datum (the challenge) sent previously, then the entity can be sure that only Alice does indeed have the unique private key ($K_{pri}A$) capable of having correctly encrypted the challenge to make a valid response to it. Alice is indeed authenticated by the entity.

6) End of life. According to the ANSSI RGS, "the end of life of a cryptographic key gives rise to a revocation, a withdrawal, or even destruction. Revoking a key is not synonymous with withdrawal inasmuch as a key can have been revoked and continued to be used for verification or upward compatibility operations. Similarly, withdrawal does not necessarily mean that the key will no longer ever be used; it may be archived to make it possible, for example, to conduct a survey after its withdrawal." According to the present invention, a public key ownership certificate is issued without an end-of-validity duration. As long as it is present on the server of the electronic notary, it is considered valid and can be consulted online by anyone (identity providers, organizations, individuals) to check the value of the public key and that it belongs to the right person. According to the present invention, the individual retrieves control of his or her security information and becomes responsible once again for his or her identity. No-one other than him or her has the right to terminate this ownership certificate.

The recurrent problem in the complex management of revoked certificates lists (certificate revocation list, CRL) in the hierarchical PKI no longer arises in the novel PKI that is presented. In case of loss, of compromise or of theft of the private key, the individual must obviously react by asking his or her local registration agency to delete the publication of his or her ownership certificate on the electronic notary server as soon as possible.

7) Renewal. According to the ANSSI RGS, "the renewal of a cryptographic key is a process to be provided from the very design of a computer system. This renewal can occur normally or be provoked by chance events like compromise." According to the present invention, in case of loss, of compromise or of theft of his or her private key, the individual must first ask his or her local registration agency (LRA) to delete the publication of his or her "public key ownership certificate" on the electronic notary server. Only a LRA linked to the electronic notary is able to give a command to delete a public key ownership certificate. Only the individual can authorize his or her LRA to do so.

According to the present invention, a pre-stamped paper revocation form, issued at the time of enrollment of the individual can also be a revocation vector. This form to be mailed comprises two parts: one for the central office of the registration authority, one for the LRA. Either of the two makes it possible to suspend the publication of the public key ownership certificate on the electronic notary (EN) server. The combination of both makes it possible to delete the "public key ownership certificate" on the EN server after a final check with the individual. The logical continuation of the procedure is the generation of a new key pair, of a new public key certificate and of the corresponding new "public key ownership certificate". The use of the module for automatically publishing his or her new public key (public key certificate) with the identity providers and directories simplifies the life of the individual in the renewal phase.

8) Recovery. According to the ANSSI RGS, "the recovery of a key is an operation whose object can be to ensure the availability of a service or to respond to legal requirements. This type of functionality is all the more difficult to implement since its objectives are inherently contrary to the security objectives that are otherwise targeted. The precise definition of the targeted functionality is essential as is a global cryptographic appraisal."

The offices of "Baker & McKenzie" provide appraisal on the topic of key sequestration. "The issue of key sequestration is a true problem, particularly in the context of the fight against cyber criminality. These days, to our knowledge, no company provides this sequestration function on behalf of the law. This sequestration obligation seems to result from article 434-15-2 of the penal code, according to which all persons party to a secret agreement, that is to say, the holder, the issuer, the recipient or recipients of the encrypted messages and the cryptography service providers (and therefore also the asymmetrical signature key providers) are obliged to hand over and apply the secret conventions to the legal authorities. There is a risk in the case where the user is the guardian of the keys that he or she will be unable to discharge his or her legal obligations in the case where he or she has lost his or her keys or has destroyed them accidentally."

Another use of the present invention makes it possible to secure the "card portfolio" (PoDeCa) of an individual by combining the public key and public key ownership certificates. The process is as follows. 1) The content of the PoDeCa is in clear. 2) The legitimate user of the PoDeCa wants to encrypt the content of the PoDeCa and transmits his or her "user" public key certificate to the PoDeCa. 3) The identity selector requests the electronic notary server mentioned in the certificate. 4) The electronic notary server proves its identity to the identity selector by virtue of its server certificate issued by a recognized certification authority (Secure Socket Layer/Transport Layer Security SSL/TLS certificate). 5) The electronic notary server sends the response to the request concerning the ownership certificate of the user to the identity selector. 6) In case of a positive response concerning the validity of the public key and its ownership, the content of the PoDeCa is encrypted by the identity selector with this public key, thus locking access to its content to any person other than the holder of the corresponding private key (that is to say the legitimate user). 7) The legitimate owner of the PoDeCa is the only one able to decrypt the content of the PoDeCa with his or her private key.

What is important using the steps 3), 4), 5) and 6) is that no-one other than the legitimate user can encrypt the content of the PoDeCa and thus prevent the legitimate use of an originally open PoDeCa.

The CNIE (French national electronic identity card) or "e-ID card" already exists in many countries and is planned in many others. Coexistence with the present invention is therefore inevitable and must be broached. It can be considered that the "e-ID card" should be employed essentially for procedures with high stakes, the object of which relates to royalty or even the territorial communities. The deployment of "administrative point terminals" (TPA) in rest stops and administrative centers like the point of sale terminals (TPV) in current outlets is one way to be favored. The rest of the administrative procedures with lower stakes are done by Internet, without the obligatory use of the e-ID card. It is difficult in fact to imagine, in the short term in certain countries, a massive deployment of chip card readers to a very numerous population. This project has already been envisaged many times in the past in other contexts but has never come to fruition.

According to the invention, the two systems, e-ID card and PKI "2.0" must coexist as follows. The e-ID card is used for the physical administrative procedures at stake in the administrative centers and rest stops all equipped with TPA. The e-ID card is used for the online administrative procedures when the user has a chip card reader. The e-ID card is used by the choice of the user for other online services when the user has a chip card reader. The "user" public key certificate will be able to be used by choice of the user for online services (all physical media taken together). The "user" public key certificate will be able to be used by choice of the user for the online administrative procedures with low stakes authorized by the state (all physical media taken together).

The absence of wide-scale deployment of the current PKIs at the level of the individual (citizen/consumer/professional) stems more from the problems of organization and the cost than problems linked to an already proven technology. The three-level PKI proposes a multi-level architecture and new cryptographic protocols which address the level of the individuals and defines a new organization. This new organization is both more realistic on a practical plane and implies a significant cost reduction. The present invention involves the individual more and gives the individual more responsibility than in the context of a conventional PKI. However, it spares the individual the complexity of the current model where the role of the certification authorities seems nebulous.

The economic model of the invention provides for a free basic service or, at most, a price corresponding to the cost of the issue of the public key ownership certificate. Options proposed by the local registration agencies (LRA) may be payable, including: supply of the physical authenticator (for example, USB key, USB crypto-key, chip card, etc.), the delay in publishing the public key ownership certificate on the electronic notary server (for example, under 48 hours free, under 4 hours payable), the handover of a pre-stamped form requesting revocation of the public key ownership certificate, the automatic publication by the LRA of the public key certificate of the individual on the main public key directories and identity providers (IDP and IP/STS) of his or her choice, etc. The economic model of the invention eliminates the recurrent cost of an annual fee as is currently the case with the payable certificates from the private certification authorities. The economic model of the invention reduces the cost of the PKI for the individual (free for the basic service and inexpensive with the options) to allow for its widescale adoption.

Other drawbacks with the conventional PKIs are known, and in particular concerning the certification authority (CA) which constitutes the cornerstone of its security. In practice, the private key of the CA which signs the person certificates supports all the weight of the security by itself. According to the ANSSI RGS, "In many cryptographic systems, notably those involving trusted third parties, there are one or more keys for which misuse or infringement of integrity may lead to violations of the security objectives of all or of most of the system players. They are, for example, master keys of a key derivation system, a network key or the private key of a certification authority. We talk in this case of a key exhibiting a risk of systemic impact or, to be more precise, of a key with systemic risk. [ . . . ] This rule aims to raise the awareness of the designers to the potential risk in having all of the cryptographic system rely on a key with systemic risk without providing for the case where the security objectives on this key are compromised. [ . . . ] No purely technical system is able to satisfactorily protect a key exhibiting a systemic risk. [ . . . ] Experience proves that a systematic study of the impact of each key provides a lot in improving the robustness of the system, notably by identifying exactly those keys that exhibit a systemic impact."

The misuse of the private key of a certification authority (CA) amounts to rendering all the certificates issued hitherto by this CA obsolete. Ensuring the security of the private key of the CA (whose lifetime is great) to preserve it from a systemic risk is therefore very costly. This cost is necessarily reflected in the price of the annual fee for the person certificates.

According to the present invention, the weight of the security is better distributed between the players. There are genuinely no keys with systemic risk. The security of the system is only improved because the collective stake decreases, above all when very many individuals are concerned. Each individual assumes responsibility for the individual certification of his or her public key. The registration agent, for its part, guarantees only the process. The registration authority therefore does not support the weight of the responsibilities of a certification authority which has to assume all the public key certificates that it has issued.

The present invention introduces the concept of electronic notary (EN). The EN and the certification authority (CA) are both trusted third parties (TC). That said, a CA corresponds to a precise type of trusted third party which follows specific rules (private key of the CA which signs the certificates issued, CRL certificate revocation list, OCSP on-line certificate status protocol) and has its own security requirements. The EN does not fall within this category: it is a directory (or a database) of "public key ownership certificates" of its trust space. Its security requirements concern its availability (like any critical server), its integrity and its authenticity which can easily be ensured by the signing of its content, that is to say the records themselves and the overall directory. The EN does not hold the public key of the physical persons and it has not signed any public key certificate. The issue of the security of the EN is therefore different from that of a certification authority.

The electronic notary server has: an "internal" key pair of its internal PKI for its secure exchanges with its own local registration agencies; an "external" key pair whose public key is certified by a "recognized" certification authority that can be verified by all (individual with his or her browser and service on the Internet).

According to the present invention, the external private key of the electronic notary is placed in an offline HSM (hardware security module) and signs each new record then published on the server (online) of the EN. Each record corresponds to a "public key ownership certificate" of the database. Thus, it is possible to verify the integrity and the authenticity of the content proposed by the EN by virtue of the certificate of the external public key of the EN signed by a "recognized" certification authority.

According to the invention, a record of the "public key ownership certificates" directory of the electronic notary (EN) is made up of the following elements: the serial number of the ownership certificate (this number which serves as index or as identifier for the record is the same as that of the X.509v3 public key certificate of the individual); a version which indicates the version of the standard to which this certificate corresponds; a sealing algorithm (identifier of the algorithm which was used to seal the "public key ownership certificate"); the public key ownership certificate of the individual (sealed); the signature of the electronic notary on all of the preceding fields (and therefore over all of the record).

According to the invention, the protocol for verification by an entity of the public key of an individual (named Alice) is as follows: 1) Recovery of Alice's public key certificate (how to be sure that this public key $K_{pub}X$ written in Alice's public key certificate is indeed that of Alice?). 2) Reading of the (serial) number of the certificate. 3) Reading of the public key $K_{pub}X$ that is legible in the certificate. 4) Reading of the address of the server of the electronic notary (EN) (in, for example, X.509v3 CRL distribution points) contained in the public key certificate. 4a) Verification of the public key certificate of the EN server (signed by a recognized CA). 5) Real time request to the server of the EN to read Alice's "public key ownership certificate" with the index value equal to the (serial) number of the public key certificate. 6) Verification of the integrity of the record found and authentication of the electronic notary which published it: verification of the signature of the record with the certificate of the electronic notary present in the browser or the server of the entity (in practice, the electronic notary signs each record of its directory with its private key for which the corresponding public key has been certified by a "recognized" CA). 7) If the record is integral and the EN is indeed authenticated, attempt to open the ownership certificate if it is opaque or verification of the signature of the ownership certificate if it is legible with the public key $K_{pub}X$. 8) If $K_{pub}X=K_{pub}A$ (that is to say is correct) then the ownership certificate is opened and becomes legible if it was opaque, otherwise it remains illegible (no disclosure of information) or else its signature is verified if it was legible: first verification. 9) Computation of the hash value of this public key: $H(K_{pub}X)=e_{pub}X$. 10) Since the ownership certificate is legible, comparison of $e_{pub}X$ computed in step 9) with the hash value read in the certificate $e_{pub}A$. If matched, then Alice's public key is indeed verified: second verification. 11) Verification of the signature of the LRA present in the public key certificate received with the public key of the LRA held by the EN server: in case of a successful verification, the public key certificate received is indeed authentic. On completion of this protocol, the entity can use Alice's public key in total confidence.

According to the invention, the three-level PKI "2.0" is based on two proven hierarchical PKIs ("recognized" and "internal") combined with a novel so-called "user" non-hierarchical PKI for dealing with the case of end users in large numbers (the individuals), a weak point in the first two.

The present invention settles the problem associated with the revocation of the certificates of the end users (consultation and updating of the list of revoked certificates) because the "public key ownership certificates" can be consulted in real time on the electronic notary server.

The initial advantage of the hierarchical PKI which consists in not needing to be online to check a certificate issued by a third party no longer seems very topical given virtual need to frequently download certificate revocation lists CRL and even more so with the OCSP (online certificate status protocol) protocol for checking online the validity of the certificates. The hypothetical disadvantage of the need to consult the ownership certificates online in the "user" non-hierarchical PKI according to the invention is therefore no longer truly a disadvantage.

According to the present invention, the public key certificates parameterized for the "user" non-hierarchical PKI do, however, conform to the standard of an X.509v3 hierarchical PKI in order to be able to be used by the existing applications.

The public key certificate associates with the public key information specific to the user to which it relates. This information is added to the basic information of version number, serial number, signature algorithm, validity period, and other such type. The extensions introduced in the X.509v3 standard make it possible to specify a certain number of information items according to the planned use of a certificate. Version: (indicates the X.509 version to which this certificate corresponds). Serial number: serial number of the certificate.

According to the invention, this same (serial) number is reused as index of the record in the directory (or the database) of the "public key ownership certificates" published by the electronic notary. Signature algorithm: identifier of the type of signature used. According to the invention, issuer: distinguished name (DN) of the registration authority (and not certification authority) which controlled the creation of this certificate (and not which issued this certificate). According to the invention, validity from: the date of creation of the certificate (and not the certificate validity start date). According to the invention, valid until: there is no longer a certificate validity end date because it is the ownership certificate which is valid. According to one form of application of the invention, a duration of 10 years can be applied by default, counted from the date of creation. Object: distinguished name (DN) of the holder of the public key (the user, that is to say the citizen/consumer/professional individual). Public key: information on the public key of this certificate. X.509v3 extensions: optional generic extensions, introduced with version 3 of X.509. According to the invention, signature: signature of the user on all the above fields (and not the signature of the certification authority).

Among the useful extensions, there are the following information items. X509v3 basic constraint: indicates if it is the certificate of a certification authority or not, that is to say that can be used to issue certificates. According to the invention, the value is set to CA:FALSE (this certificate cannot be used to generate other certificates). Netscape Cert Type: SSL client, S/MIME, object signing: these extensions enable the owner of the certificate to be authenticated with SSL servers, emails and to decrypt them (for example extensions for Thunderbird® and Firefox®). X509v3 key usage: gives one or more security functions for which the public key is intended. This field makes it possible to specify a number of security services. Digital signature/nonrepudiation/key encipherment: these extensions make it possible to sign messages, to check that the owner is indeed the author of an action. Key encipherment makes it possible to use S/MIME encryption. X509v3 subjectAltName: this field contains one or more alternative names for the certificate holder, expressed in various possible forms. According to one form of application of the invention, this field could be the user's email address, such as for example: "individual@myemailprovider.fr".

According to the invention, X509v3 issuerAltName: this field contains one or more alternative names for the registration authority which controlled the creation of this certificate, expressed in various possible forms. X509v3 CRL distribution points: normally this field contains the address of the certificate revocation list (CRL) making it possible to know the status of this certificate. According to the invention, this field contains the address of the electronic notary server of the registration authority which controlled the creation of this certificate. For example
"URL:http://electronicnotary.frenchnotaries.fr"
"URL:http://electronicnotary.mytelecomoperator.fr"
"URL:http://electronicnotary.mybank.fr".

According to the present invention, the private life of the citizen/consumer/professional individual is not directly entrusted, either to a single all-powerful state (the executive), or to a few private commercial companies (the certification authorities, sometimes foreign companies) which enjoy quasi-monopolies. The state is a guarantor to ensure trust (via the legal authority and the notaries) but not a direct player.

In the case of the royal circle, the notary reports to the state, because it is sworn as ministerial officer (it depends on the justice ministry); but it does not report either to the executive (the government) or to the legislature (parliament): in these conditions, the state will find it difficult to act the "big brother". The person, the individual, is placed at the center of the new infrastructure because he or she has his or her own "public key ownership certificate" established without delegating the certification to a certification authority. The citizen/consumer/professional individual then has more freedom in publishing his or her public key certificates.

The French administration has established, for its own needs, and for the organizations required to work in the context of public orders, a security referencing policy PRIS (Politique de Référencement Intersectorielle de Sécurité, Inter-Sector Security Referencing Policy) version 2.1 dated November 2006. This policy applies in particular to the dematerialization of electronic exchanges. The PRIS recommendations relate to the use of public key architectures (PKI). The PRIS defines 3 security levels which range from one star to three stars. The 3* level demands: strong authentication, face-to-face registration, face-to-face handover/acceptance of a certificate if not done at the time of registration, if the certification authority does not generate the key pair, verification that the certificate is indeed associated with the corresponding private key (remote loading on a chip card), explicit acceptance of the certificate by the holder. The registration and issue of the person certificates implemented by the "user" PKI according to the invention observe the level 3* conditions.

The "user" PKI according to the invention recommends, for each citizen/consumer/professional individual, the storage on a physical authentication and signature medium of two key pairs: the first for authentication (with presumption of reliability), the second for the electronic signature in order to validate a transaction by marking consent. The two private keys will have to be stored securely: either by being encrypted and stored in a memory with free access, or by being stored in clear in a secured memory with access control, or by being stored encrypted in a secured memory with access control (the safest solution).

According to the present invention, the self-signed X.509v3 public key certificates are stored in clear. The first is an authentication certificate. The second is a signature (verification) certificate whose legal value devolves from the European directive 1999/93.

According to the invention, the registration agent provides a proximity service delegated by the registration authority. This registration agent is the guarantor of the process of registration and of issue of the certificates but does not by any means retain all the keys. It does not retain the private key of the individuals which is the least of the things, but nor does it retain their public keys for which it stores only the hash value in the "public key ownership certificate" that it publishes on the electronic notary server of his or her authority.

According to the invention, it is a notary who serves as registration agent/authority for the royal circle. The French notary service already has an "internal" PKI which gives each notary the power to digitally sign authentic deeds. The notary service is organized at the international level and it is not specific to France. This new organization is therefore empowered to become worldwide.

According to one mode of application of the invention, the Web browsers, the identity selectors and the email software contain "hard" records of the addresses of some tens of electronic notary servers by countries with their own certificates (for the verification of the integrity of their base) in addition to the certificates of the main current certification authorities.

According to one mode of application of the invention, free delivery of the service must remain the rule for the individual. The banks like the telecommunications operators can assume the cost of the operation of enrolling "user" PKI consumers through their respective registration agencies by combining with a commercial and/or loyalty-promoting action linked to the physical movement of the individuals. The benefits expected of the trust thus created in the many electronic transactions which involve the bank or telecommunications operator more than compensate for the time and cost of enrollment. Moreover, there are numerous paying options which provide added value to the individual and which enable the agencies to be paid.

According to one mode of application of the invention, the town halls are responsible for enrolling citizens in the "user" PKI for the territorial communities circle. This mission, like the issuing of the national electronic identity card (CNIE) or e-ID card, is compatible with the many services already proposed to the constituents.

According to one mode of application of the invention, the government requires the French notaries to deliver the service of issuing of the "user" (public key and ownership) certificates to the citizens on a virtually free basis by enabling the notaries to make what they do more familiar during this operation. In practice, the notaries usually have few occasions (purchase of a good, marriage agreement, inheritance) to bring their clients into their chambers. A psychological price equivalent to that of a medical consultation with a general practitioner for the registration of the individual, payable just once at the time of the deed, is a maximum not to be exceeded.

According to one mode of application of the invention, with free delivery being the objective to be achieved for the basic service, optional services could be payable: supply of the physical authenticator (chip card, reader or USB cryptokey), shorter delay in publishing the "public key ownership certificate" of the individual on the electronic notary server, automatic publication of the public key certificate of the individual on the main directories and other identity providers, etc.

The public key certificate contains personal information: name, first name, date and place of birth. This information is deemed confidential: even the persistent identifier between each pair (identity provider, service provider) is unique and opaque in order not to unwittingly reveal confidential information concerning a user. The fact of transmitting this information to be authenticated can thus be an obstacle to the need to know it. How can this constraint be circumvented? How can confidential information concerning the user not be included in the public key certificates? What information should be included therein in this case?

According to one particular mode of application of the invention, the in clear identity of the user is replaced in the public key certificate by an identifier or, more specifically, an identity hash value. This identity hash value is, for example: eid=H (name+first name(s)+date of birth+place of birth), with H being a one-way hash cryptographic function, which corresponds to an identity hash value. The string to be hashed one way is long enough to avoid any hacking by dictionary. When a party knows the person sufficiently well (or else by reading his or her national identity card), it is possible to verify, on a per-case basis, that it is indeed that person. For example, if I know the individual Alice well, I also know her date and place of birth and I'd compute: H(Alicename+Alice+Jan. 1, 1962+Saint-Etienne) to verify that the identity hash value "eid" stored in the public key certificate does indeed correspond to her.

The "user" PKI is centered on the end user to whom it provides trust and security. Providing the end users, that is to say the citizen/consumer/professional individuals, with security cryptographic means is a real need. This need is not currently satisfied by the solutions embodied in the "recognized" (or "international") and "internal" PKIs which do not reach the citizen/consumer/professional individual according to a reasonable (security+responsibility+constraint)/cost ratio.

The "user" PKI is more economical because, with equivalent security and trust scope, the cost of a user certificate issued and managed by a "recognized" or recognized certification authority is much higher. In the present invention, the management of the electronic notary servers of the registration authorities and their security regarding availability and integrity do not present any significant additional cost as is the case for the infrastructures of the certification authorities, which are subject to systemic risks.

According to an extract from the electronic signature guide published in October 2008 by the FNTC (National Federation of Trusted Third Parties): "The electronic signature has the same value as the handwritten signature provided that it makes it possible to identify the person who provides it and embodies the agreement of the parties to the obligations which devolve from this deed (article 1316-4 of the French Civil Code). It is important to note that, in the case of dispute, it is the judge who will assess, with sovereign power, the probative nature of the signature and, thereby, its legal value, and will do so whether the signature is handwritten or electronic (articles 285 et seq. of the Civil Proceedings Code). It should be remembered that, from a strictly legal point of view, little importance is attached to whether the electronic signatures are "simple", "secure", or whether they use "qualified certificates": they all have the same legal value. A point often stressed is the "presumption of reliability", attached to the secure electronic signatures produced according to the system specified in article 1316-4, para 2 of the Civil Code and in article 2 of the ministerial order dated 30 Mar. 2001. It is, however, essential to remember two elements on this topic: the legal weight of the signature "bringing a presumption of reliability" is weak in the context of B to B (business to business) or B to C (business to consumer) relations; the requirements concerning the secure signature are restrictive to implement, and in practice concern only a very reduced population, mainly the regulated professions for perfecting authentic deeds. Since the reform of the Civil Code, the electronic signature has the same value as a handwritten signature. To benefit from the presumption of reliability, the electronic signature must be created in accordance with the ministerial order dated 30 Mar. 2001. In particular, it is essential for the electronic signature system to rely on a secure electronic signature creation device. This device is evaluated by an evaluation center approved by the ANSSI before being certified as conforming by the ANSSI (article 3.11 of the ministerial order dated 30 Mar. 2001). The verification of the electronic signature relies on the use of a qualified electronic certificate (that is to say, one issued by an electronic certification service provider which undertakes to comply with a certain number of conditions—article 6 of the ministerial order—or which has been accredited by the COFRAC—article 7 of the ministerial order)."

In the present invention, there is indeed a "public key ownership certificate", but which does not rely on a recognized certification authority. The electronic signature created by the mechanism of a "user" PKI is therefore perfectly valid.

There are, however, limitations to the electronic signature created in the context of a "user" PKI because it is not based on a secure creation device or on a qualified certificate within the meaning of the Civil Code. Consequently, the electronic signature created does not benefit from the presumption of reliability in terms of proof. Consequently, it is incumbent on the users of the electronic signature to prove that the link between the electronic signature and the deed to which it is attached is reliable (article 1316-4 of the Civil Code).

In the case of signature spoofing, reliability is limited because the electronic signature created by a "user" PKI is not qualified and has no presumption of reliability. In particular, this electronic signature does not use qualified certificates and the registration authorities do not undertake to comply with the conditions of article 6.II of the ministerial order dated 30 Mar. 2001. It will be up to the user to prove that it is indeed him or her who has signed. The same applies for the service provider.

In the present invention, the signature created by the "user" PKI operates in a contractual context. The registration authority (RA) contractually defines the scope of the responsibilities by the addition of a specific contract between the RA (bank or telecommunications operator=there is already a contract) and the end user who specifies the responsibilities of the RA and indicates notably that, since the electronic signature does not benefit from a presumption of reliability within the meaning of article 1316-4 of the Civil Code, its probative force should be secured by contract. Thus, the probative value of the deed to which the electronic signature created in the context of a "user" PKI is affixed should be contractually recognized by the parties to the contract.

In this respect, different situations should be differentiated. With regard to the contracts entered into between merchants, the proof is free and such an agreement of proof does not raise any problem. With regard to the contracts entered into between a merchant and a consumer, distinctions should be drawn according to the value of the contract. For contracts with a value less than € 1500, the proof is free and it is possible to provide, in the contract with the user, an agreement of proof. On the other hand, the Civil Code requires contracts with a value higher than € 1500 to be entered into in writing (article 1341 of the Civil Code and ministerial order No. 80-533 dated 15 Jul. 1980 amended by ministerial order No. 2001-476 dated 30 May 2001 and ministerial order No. 2004-836 dated 20 Aug. 2004). According to article 1316-1 of the Civil Code, writing in electronic form has the same value as writing on paper "provided that the person from which it emanates can be duly identified and that it is established and conserved in conditions likely to guarantee its integrity" (article 1316-1 of the Civil Code).

These conditions are not fulfilled de facto by the electronic signature issued in the context of a "user" PKI, which means that the legal deeds to which this electronic signature is affixed are not considered to be written documents. However, it appears that the requirement of a written document of article 1341 of the Civil Code can be excluded in the context of an agreement of proof. The final court of appeal in France has thus recognized the validity of such an agreement with regard to the use of the code of the bank card (final court of appeal, Civ. $1^{st}$, 8 Nov. 1989). Nevertheless, the validity of such an agreement of proof may be called into question in the area of consumer law: in practice, the clauses that overturn the burden of proof to the detriment of the consumer or might limit his or her means of proof are generally considered excessive, when one party relies purely and simply on a probative system which would be entirely under the control of the other party, would be valid. It should be noted that, in addition to these rules of proof, rules of validity of the contracts entered into electronically with the consumers, which remain subject to the "double-click" requirement of article 1369-1 of the Civil Code which is of a public nature and cannot be excluded by an agreement of proof (except between professionals), should also be observed. In the absence of such a mechanism, these contracts are not valid.

In terms of usages, the solution of a "user" non-hierarchical PKI is well suited to the B to B context of small businesses. For the B to C context, it could constitute an intermediate solution between a simple presumption (thousands of contracts are signed every day under this regime) and the use of a qualified certificate.

According to the PKI "2.0", the individual is responsible for his or her keys (private and public) as well as his or her public key certificates.

According to the PKI "2.0", the registration authority (RA) is responsible for the "public key ownership certificates" that it has issued (without however signing them and certifying them) and that it publishes on its electronic notary server. The RA guarantees the registration, the delivery and the authenticity of the "public key ownership certificate". It does not store any key of the individual.

According to the PKI "2.0", no central organization assumes the responsibility for the public key certificate of millions of citizen/consumer/professional individuals. Nor is the executive power suspected of being master of the game (refer to the problems posed by the "Edvige" file).

In the case of an "internal" hierarchical PKI deployed on a wide scale, the problem of the responsibility of the certification authority, of its legitimacy and of respect for private life arises. If this PKI is of a state nature: its responsibility is normal but budgeted (with a cost), its legitimacy is normal, its respect for private life is inappropriate. If this PKI is of a private nature: its responsibility is normal but billed, its legitimacy is normal and its respect for private life is inappropriate. If this PKI is of a "dedicated organization" nature: its responsibility is normal, its legitimacy is difficult to acquire, its respect for private life is inappropriate. None of these PKIs is fully satisfactory.

The private life of the citizen/consumer/professional individual should not be entrusted directly to a single, all-powerful state (to the executive). The state should be a guarantor to ensure the trust (via the legal authority) but not a direct player.

The private life of the citizen/consumer/professional should not be entrusted directly to a large private commercial company enjoying a virtual monopoly. In the case of a multiplicity of private certification authorities (CA), there would be a return to the imbroglio of the pyramidal architecture of the CAs for addressing users with widely varying prospects.

The three-level PKI "2.0" retains the undeniable advantages of the "recognized" and "internal" PKIs for their respective usages. The "recognized" PKI addresses few players: IDPs/IPs, APs, SPs/RPs, electronic notaries, etc. The "internal" PKI address a number of significant players (several thousand), namely the proximity agencies of the registration authorities: the local registration agencies.

In the present invention, the "user" non-hierarchical PKI which addresses all citizen/consumer/professional individuals dispenses with the certification authorities and therefore with their proven weakness in dealing with a very large number of users of varying prospects. The "user" PKI is based on the contrary on registration authorities that have an existing network of proximity agencies and an electronic notary server, all of which are perfectly suited thereto. In the present invention, the "user" PKI gives the individual control of his or her digital identity, as central, unavoidable and responsible player.

The invention claimed is:

1. A non-hierarchical infrastructure for managing security key pair for physical persons or items, comprising a public key and a private key with a public key certificate that has a unique number, said infrastructure not including any certification authority separate from the physical persons or items, said infrastructure comprising:

for each of at least one registration authority, an electronic notary server of said at least one registration authority, wherein, said registration authority and its electronic notary server being provided for a trust circle, said registration authority comprising a plurality of proximity local registration agencies;

for each of said proximity local registration agencies, a computer device on which a program is installed, said program being configured for:

establishing, for each physical person or item;
a public key certificate comprising:
first data including:
a unique number,
a public key of said person or item,
an identification of said person or item,
an address of the electronic notary server of the registration authority for which the local agency has registered the physical person or item, and
a signature of said first data, a public key ownership certificate which is self-sealed, comprising:
  second data including:
    the same unique number as the public key certificate;
    the identity of the physical person or the identification of the element and
    a representation of the public key thereof;
  a signature with a private key of the physical person or item associated with said public key, of said second data, or
    the same unique number as the public key certificate;
  third data including:
    the identity of the physical person or the identification of the element, and
    a representation of the public key thereof,
  wherein said third data is encrypted with the private key of the physical person or item, according to an atypical use of this key, in order to render said third data opaque but not the unique number, and
  transmitting securely said public key ownership certificate to the associated electronic notary server which stores it.

2. The infrastructure as claimed in claim 1, characterized in that the representation of the public key of the physical person or of the item is a hash value of this public key.

3. The infrastructure as claimed in claim 1, characterized in that the public key ownership certificate of the physical person or of the item is also signed by the local registration agency and contains this signature.

4. The infrastructure as claimed in claim 1, characterized in that the public key ownership certificates are retained securely on the electronic notary server of the registration authority.

5. The infrastructure as claimed in claim 1, characterized in that it comprises a request module which takes as input the public key certificate of the physical person or of the item, interrogates the electronic notary server whose address is included in said public key certificate, by communicating the number of this public key certificate and said public key certificate, and which receives in return from the electronic notary server whose address is included in said public key certificate: an assertion as to the authenticity or the non-authenticity of the alleged public key of the physical person or of the item, and possibly an assertion as to the authenticity or the non-authenticity of the public key certificate of the physical person or of the item.

6. The infrastructure as claimed in claim 5, characterized in that the request module which takes as input the public key certificate of the physical person or of the item checks the authenticity of the public key of the electronic notary server whose address and public key certificate are included in said public key certificate of the physical person or of the item.

7. The infrastructure as claimed in claim 5, characterized in that the request module is placed in at least one of the following: Internet browsers, email software, identity provider servers, computer applications and computer processes.

8. The infrastructure as claimed in claim 5, characterized in that it comprises a response module which is installed on all the electronic notary servers, which receives as input the request from the request module, which searches in a database of said electronic notary server to see if there is a public key ownership certificate number identical to the public key certificate number received and which delivers an assertion of the "the public key is not authentic" type if the result of the search is negative.

9. The infrastructure as claimed in claim 5, characterized in that said public key ownership certificate comprises said second data and a signature with the private key of the physical person or item of said second data, in that it comprises a response module which is installed on all the electronic notary servers, which receives as input the request from the request module, which searches in a database of said electronic notary server to see if there is a public key ownership certificate number identical to the public key certificate number received, and in that, if the result of the search is positive, said response module carries out a check on the signature of the public key ownership certificate found if it is legible, with the received public key, and delivers an assertion of the "the public key is not authentic" type if the check fails or an assertion of the "the public key is authentic" type if the check succeeds.

10. The infrastructure as claimed in claim 5, characterized in that it comprises a response module which is installed on all the electronic notary servers, which receives as input the request from the request module, which searches in a database of said electronic notary server to see if there is a public key ownership certificate number identical to the public key certificate number received,
  and in that, if the result of the search is positive, this response module makes an attempt to decrypt the public key ownership certificate found if it is opaque, with the received public key and according to an atypical use of this key, and delivers an assertion of the "the public key is not authentic" type if the decryption fails or an assertion of the "the public key is authentic" type if the decryption succeeds.

11. The infrastructure as claimed in claim 5, characterized in that said public key ownership certificate comprises said second data and a signature with the private key of the physical person or item of said second data,
  in that the representation of the public key of the physical person or of the item is a hash value of this public key,
  in that it comprises a response module which is installed on all the electronic notary servers, which receives as input the request from the request module, which searches in a database of said electronic notary server to see if there is a public key ownership certificate number identical to the public key certificate number received, in that, if the result of the search is positive, said response module carries out a check on the signature of the public key ownership certificate found if it is legible, with the received public key, in that, if the check is positive, said response module computes a hash value of the received public key, then compares it with the hash value of the public key stored in the public key ownership certificate and in that said response module delivers an assertion of the "the public key is not authentic" type if the two hash values are different or an assertion of the "the public key is authentic" if the two hash values are identical.

12. The infrastructure as claimed in claim 5, characterized in that in that the representation of the public key of the physical person or of the item is a hash value of this public key,
  in that it comprises a response module which is installed on all the electronic notary servers, which receives as input the request from the request module, which searches in a database of said electronic notary server to see if there is a public key ownership certificate number identical to the public key certificate number received, in that, if the result of the search is positive, said response module makes an attempt to decrypt the public key ownership certificate found if it is opaque, with the received public key, in that, if the decryption succeeds, said response module computes a hash value of the received public key, then compares it with the hash value of the public key stored in the previously decrypted public key ownership certificate, and in that said response module delivers an assertion of the "the public key is not authentic" type if the two hash values are different or an assertion of the "the public key is authentic" type if the two hash values are identical.

13. The infrastructure as claimed in claim 3, characterized in that said public key ownership certificate comprises said second data and a signature with the private key of the physical person or item of said second data, in that it comprises a request module which takes as input the public key certificate of the physical person or of the item, interrogates the electronic notary server whose address is included in said public key certificate, by communicating the number of this public key certificate and said public key certificate, and which receives in return from the electronic notary server whose address is included in said public key certificate: an assertion as to the authenticity or the non-authenticity of the alleged public key of the physical person or of the item, and possibly an assertion as to the authenticity or the non-authenticity of the public key certificate of the physical person or of the item, in that it comprises a response module which is installed on all the electronic notary servers, which receives as input the request from the request module, which searches in a database of said electronic notary server to see if there is a public key ownership certificate number identical to the public key certificate number received, in that, if the result of the search is positive, said response module carries out a check on the signature of the public key ownership certificate found if it is legible, with the received public key, in that, if the check is positive, said response module checks the signature of the local registration agency with the public key of this same agency to which the module has access and in that said response module delivers an assertion of the "the public key certificate presented is not authentic" type if the check fails or an assertion of the "the public key certificate presented is authentic" type if the check succeeds.

14. The infrastructure as claimed in claim 3, characterized in that it comprises a request module which takes as input the public key certificate of the physical person or of the item, interrogates the electronic notary server whose address is included in said public key certificate, by communicating the number of this public key certificate and said public key certificate, and which receives in return from the electronic notary server whose address is included in said public key certificate: an assertion as to the authenticity or the non-authenticity of the alleged public key of the physical person or of the item, and possibly an assertion as to the authenticity or the non-authenticity of the public key certificate of the physical person or of the item, in that it comprises a response module which is installed on all the electronic notary servers, which receives as input the request from the request module, which searches in a database of said electronic notary server to see if there is a public key ownership certificate number identical to the public key certificate number received, in that, if the result of the search is positive, said response module makes an attempt to decrypt the public key ownership certificate found if it is opaque, with the received public key, in that, if the decryption succeeds, said response module checks the signature of the local registration agency with the public key of this same agency to which the module has access, and in that said response module delivers an assertion of the "the public key certificate presented is not authentic" type if the check fails or an assertion of the "the public key certificate presented is authentic" type if the check succeeds.

15. The infrastructure as claimed in claim 5, characterized in that the assertion(s) is/are signed with the private key of the electronic notary server in order to obtain a signature of the assertion(s), and in that the requesting module checks the signature of the assertion(s) by using the public key of the electronic notary server.

16. The infrastructure as claimed in claim 6, characterized in that the "server" public key of the electronic notary server is certified by an internationally recognized certification authority, said certification authority not handling the certification of the "client" certificates of physical persons or items.

17. The infrastructure as claimed in claim 1, characterized in that it comprises a personal appliance including a software tool for generating the security key pair of the physical person.

18. The infrastructure as claimed in claim 7, characterized in that the Internet browsers, the email software, the identity provider servers embed the public key certificates of the legitimate electronic notary servers.

* * * * *